US012260845B2

(12) United States Patent
Kman

(10) Patent No.: US 12,260,845 B2
(45) Date of Patent: Mar. 25, 2025

(54) COMBINATION OF CAPO AND PICK HOLDER AND DISPENSER

(71) Applicant: Stephen J. Kman, Port Crane, NY (US)

(72) Inventor: Stephen J. Kman, Port Crane, NY (US)

( * ) Notice: Subject to any disclaimer, the term of this patent is extended or adjusted under 35 U.S.C. 154(b) by 0 days.

(21) Appl. No.: 18/828,430

(22) Filed: Sep. 9, 2024

(65) Prior Publication Data

US 2025/0054469 A1 Feb. 13, 2025

Related U.S. Application Data

(63) Continuation-in-part of application No. 18/070,681, filed on Nov. 29, 2022, now Pat. No. 12,112,728.

(51) Int. Cl.
*G10D 3/053* (2020.01)
*G10D 3/173* (2020.01)

(52) U.S. Cl.
CPC ............. *G10D 3/053* (2020.02); *G10D 3/173* (2020.02)

(58) Field of Classification Search
CPC ............................... G10D 3/053; G10D 3/173
See application file for complete search history.

(56) References Cited

U.S. PATENT DOCUMENTS

| | | | | |
|---|---|---|---|---|
| 3,992,975 A | | 11/1976 | Gallagher | |
| 4,583,440 A | * | 4/1986 | Powell, Jr. | G10D 3/053 984/114 |
| 4,785,708 A | | 11/1988 | Vaughn | |
| D309,674 S | | 8/1990 | Gervase | |
| 5,649,634 A | | 7/1997 | Irizarry | |
| 6,215,052 B1 | * | 4/2001 | Giddens | G10D 3/173 84/322 |
| 6,933,430 B2 | | 8/2005 | Oskorep | |
| 7,199,295 B2 | | 4/2007 | Oskorep | |
| 7,566,824 B2 | * | 7/2009 | Small | G10D 3/053 84/318 |
| 7,626,103 B1 | | 12/2009 | Phillips | |
| 7,847,171 B1 | | 12/2010 | Kidd, III | |
| 9,368,091 B2 | * | 6/2016 | Skutt | G10D 3/053 |
| 9,418,633 B1 | | 8/2016 | Storck | |
| 10,043,495 B1 | | 8/2018 | Paterson | |
| 10,210,849 B1 | | 2/2019 | Britt | |
| 10,347,227 B1 | | 7/2019 | Britt | |
| 12,112,728 B2 | * | 10/2024 | Kman | A47F 1/12 |

* cited by examiner

*Primary Examiner* — Robert W Horn
(74) *Attorney, Agent, or Firm* — Bernhard P Molldrem, Jr.

(57) ABSTRACT

A combination of a guitar capo and a guitar pick holder and dispenser is configured so picks are available to the player when needed. The pick holder and dispenser has a generally rectangular recess as a receptacle to fit onto the hand grip or head of the capo upper handle, and a notch is provided at a lower end to fit onto the foot of the capo, at the base of the upper handle. The receptacle may have fins or ribs to accept and hold the hand grip or head.

7 Claims, 7 Drawing Sheets

COMBINATION OF CAPO AND PICK HOLDER AND DISPENSER

This is a continuation-in-part of my co-pending patent application Ser. No. 18/070,681, filed Nov. 29, 2022, now Pub. No. US 2024/0177693, May 30, 2024, the disclosure whereof is incorporated by reference.

FIELD OF THE INVENTION

This invention relates to pick or plectrum dispensers to be used with a guitar or other string instrument, and is more specifically a holder and dispenser for guitar picks that can be removably mounted on a capo to be used on the neck and fingerboard or fretboard of the guitar. The same or similar capo and pick holder can be used with other string instruments such as ukulele, banjo, or mandolin.

OBJECTS AND SUMMARY OF THE INVENTION

The invention is more particularly concerned with a pick dispenser that the guitar player can carry with him while practicing or performing, and from which he can quickly obtain a replacement pick, even while playing his or her instrument. Also, this invention concerns a capo that can be placed on the fretboard or fingerboard of the instrument to change the pitch of the open strings. Here the term guitar pick means a pick or plectrum, which is a thin, usually triangular or ovoid flat member that can be held between the thumb and forefinger for plucking or strumming one or more strings of the instrument. The term is meant to apply to picks and plectrums not only for guitars but also for other string instruments such as banjos, mandolins, balalaikas, and others, which usually (but not always) have frets along the neck of the instrument. These picks or similar plectrums can be used on a dulcimer, autoharp or ukulele.

Typical picks or plectra are formed of a tough and somewhat flexible material, e.g., celluloid, that is intended to simulate natural tortoiseshell. The picks can be somewhat triangular in shape, and quite thin, e.g., with a thickness of about one millimeter, but can vary from that depending on the preference of the musician. Picks or plectra may have a width at the base or gripped side being between about two and three centimeters, and a length along its axis from the base side to the nose or point of about four centimeters. These dimensions can vary greatly to satisfy the needs of a variety of musicians.

The guitar pick typically is not attached to the guitar or to the player. Because it is loose, it can be dropped accidently. When that happens, it is advantageous for another pick to be kept handy so the musician can replace it and keep on playing. However, prior attempts to provide a pick holder have not produced one that is particularly convenient, and often requires stopping play for a significant time to access the new pick.

Accordingly, there is a need for a pick holder and dispenser that is simple and quick both for dispensing a replacement pick when needed, and also for loading with a supply of picks prior to playing the instrument. There is also a need for the guitarist or other string instrument player to have the dispenser attached to the instrument or to the person in a way that allows the dispensing of a replacement pick to happen easily and quickly. It should be possible for the pick holder and dispenser to be attached to a convenient location, such as the guitar strap or to the musician's belt or to a neck lanyard, for example. It should also be configured so that the musician can simply slide a replacement pick out of the holder and dispenser when he or she needs to do that. The holder and dispenser should be of simple and straightforward construction with as few parts as are necessary.

Capos are used with guitars when there is a need to change the pitch of the guitar strings, e.g., when the music has a change of key. The capo clamps onto the neck of the guitar and has a fret bar or string press bar that presses against the guitar strings at a selected fret. These devices typically have handles allow the guitar player to open the jaw or neck press bar so the capo can be moved to the appropriate fret. In this invention, the pick holder can be configured so that a receptacle on the back wall of the pick holder clamps onto the head portion of the upper handle of the capo, and a notch at the lower end of the holder fits into a transverse recess at a foot portion of the capo. The pick holder and dispenser does not interfere with movement of the capo to a different fret, or with the installation or removal of the capo.

Accordingly it is an object of the invention to provide a pick holder which can be easily loaded by inserting a supply of guitar picks of the musician's preference, and from which the picks can be dispensed, one at a time, by sliding them out; and moreover can be conveniently mounted on a guitar capo, either at a given fret on the guitar neck or on the head portion of the neck above the nut on the guitar neck.

It is another object that the pick holder and dispenser be small and of as simple construction as possible, preferably without springs, snaps, or other movable or breakable components.

It is a further object that the pick holder and dispenser be of a convenient size and with some means of attaching it to the guitar strap, to the capo, so that it can be quickly accessed by the musician when needed.

Embodiments of the pick holder and dispenser of my invention can be configured for holding and dispensing one or more picks or plectra, and formed, for example, with an elongated base portion defined with a proximal end and a distal end. An upper surface of this base portion can be adapted for holding one or more of the picks or plectra each at a respective pick position thereon. The base portion has right and left sides that extend between the proximal and distal ends. The proximal end is configured for loading and dispensing of the picks or plectra. The base portion upper surface favorably slopes upwards from the proximal end towards the distal end. The upper surface can be configured to define a plurality of pick positions on it. Thus each pick in a stack of picks is kept until needed at a given position.

Left and right side walls favorably may extend along the left and right sides of the base portion and rise above the upper surface. Each of the side walls has an upper flange portion defining a channel portion at the respective left and right side adjacent the base portion; the base portion extends toward (but is spaced from) the upper flange portion of the other side wall, such that the two flanges define, between each other, an elongated opening above each side the base portion. The upper elongated opening can permit finger access to the picks in the holder and dispenser.

The proximal ends of the base portion and of the left and right channels are open for receiving and dispensing the picks and/or plectra.

The pick holder and dispenser may also have small dimples, buttons or bosses formed along a center line of the base portion on its upper surface, with each protruding a short distance above the upper surface. These dimples are adapted to contact a rear side or end of a pick or plectrum. These can serve to retain each such pick in a particular pick position. Alternatively or in addition, the upper surface of the base portion can formed as a series of stepped portions, which may correspond to respective pick positions. The pick positions may overlap somewhat.

The left and right side walls can be configured such that the channels receive edges of the picks, and hold and dispense picks and plectra that are of about the same width, which may vary somewhat from one pick or plectrum to another. For example, left and right channels can be adapted to receive, hold and dispense picks and plectra that have a width of approximately one inch (but may vary according to custom).

In one embodiment, the pick holder and dispenser may include a key-chain slot, formed in the distal end of said base portion. A notch may be located at that position and may assist in fitting the pick holder on the capo. For other mounting places, the slot may be of a dimension to fit onto a guitar strap or mandolin strap or banjo strap. In some versions, the pick holder-and-dispenser's side walls each have a tactile grip surface formed on a portion of it, as an assistance in the musician gripping it with his or her hand. With double-sided tape, the dispenser may be adhered, temporarily or permanently, to a side or back of the instrument.

In the illustrated embodiment, a guitar capo is configured with an upper member and aa lower member connected to one another at a pivot. The upper member has an upper handle and a string press bar with a bar press member adapted to contact the guitar fret board on the neck of the guitar. The lower member has a lower handle extending from the pivot and a neck press bar on the other side of the pivot. A spring biases the lower member so that the neck press bar is urged towards the bar press member of the upper member to clamp to the guitar neck.

There is a recess formed on the back side of the pick holder base wall, arranged to fit onto a head or hand grip (e.g., knob) at the free end of the capo upper handle. Favorably the notch on the pick holder fits into a recess at the foot portion of the capo. The pick holder recess may be generally rectangular, and may include fins or ribs that assist in gripping the head or hand grip of the capo upper handle.

An illustrative preferred embodiment (and variations) of the combination of capo and pick holder and dispenser will be described below in connection with the associated Drawing figures.

DETAILED DESCRIPTION OF A PREFERRED EMBODIMENT

Figure 1:
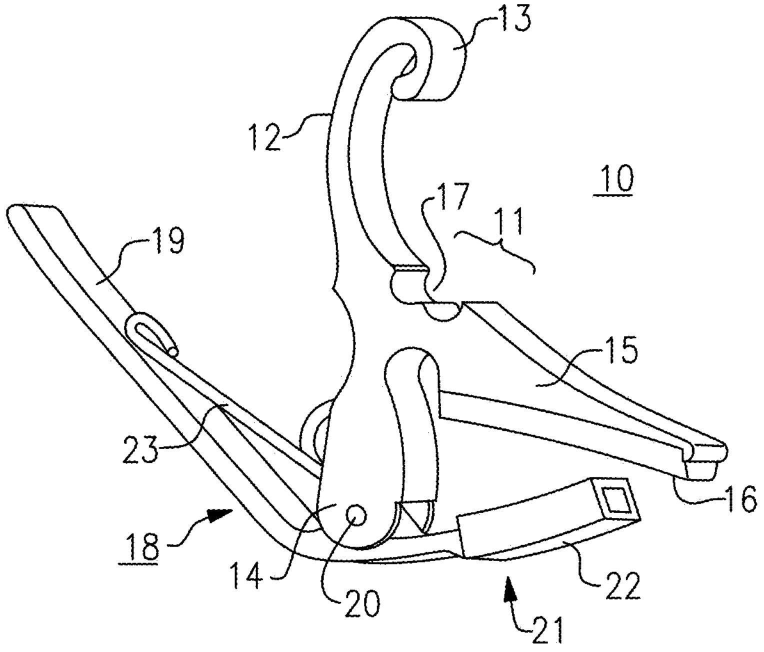
FIG. 1 is a perspective view of a capo that is in common use with string instruments such as guitars.
Figure 2:
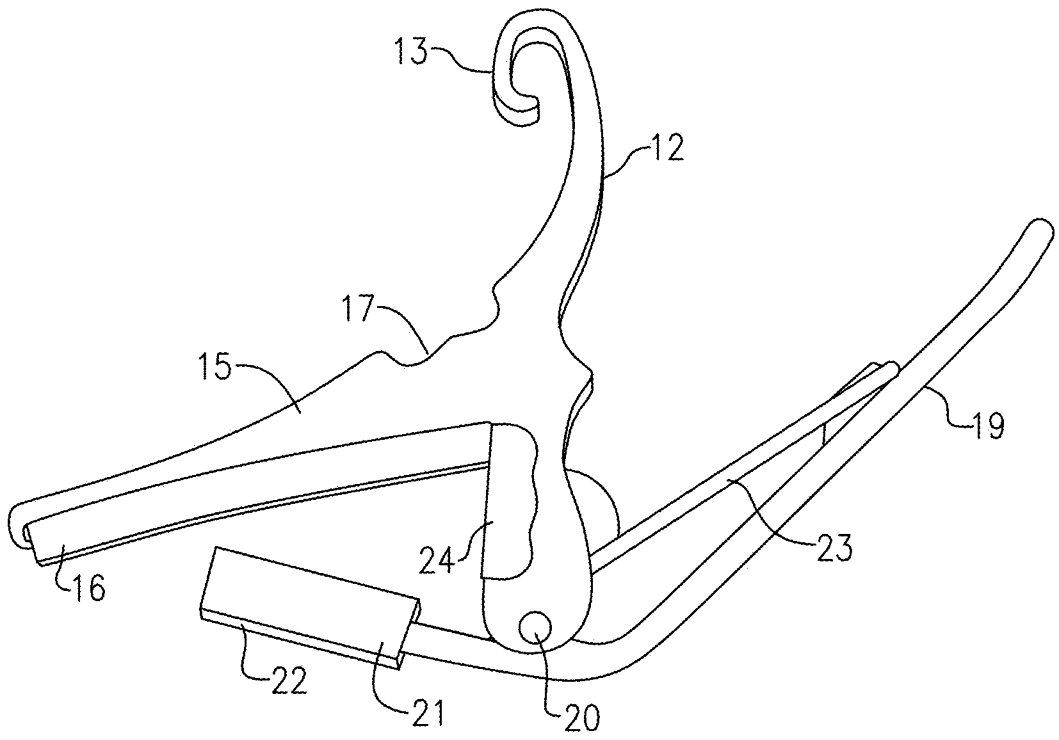
FIG. 2 is a side elevation of the capo, for explaining the same.

With reference to the Drawing figures, and initially to FIGS. 1 and 2, an example of a guitar capo 10 is presented. The capo is so configured that when placed on a neck of a guitar at a given fret, the guitar strings are all put in contact with that one fret to change the pitch of the instrument accordingly. Here the capo 10 is comprised of an upper main body portion 11 and a lower clamp portion 18.

The upper main body portion 11 has an upper handle 12, with a hand grip or head 13 formed at the end thereof, and also has an extension arm pivot 14 that connects with a string press bar 15. The string press bar holds a string contact member (typically formed of a hard rubber). At juncture of the handle 12 and the string press bar 15 is formed a foot portion 17, here formed with first and second generally cylindrical recesses. In this illustration, the hand grip or head 13 is formed as a loop portion at the end of the upper handle, but many other arrangements are possible.

The lower clamp portion 18 includes a clamp lever or lower handle 19 and a pivot portion coincident with the extension arm pivot 14, which are joined by means of a pivot pin 20. The extension arm pivot 14 joins to a positioning clamp 21 (adapted to press against the back of the guitar neck), and this has a plastic cushion 22 over it. A spring 23 biases the positioning clamp 21 in the direction against the guitar neck. A neck pad 24 may be present to seat against one side of the guitar neck.

Figure 3:
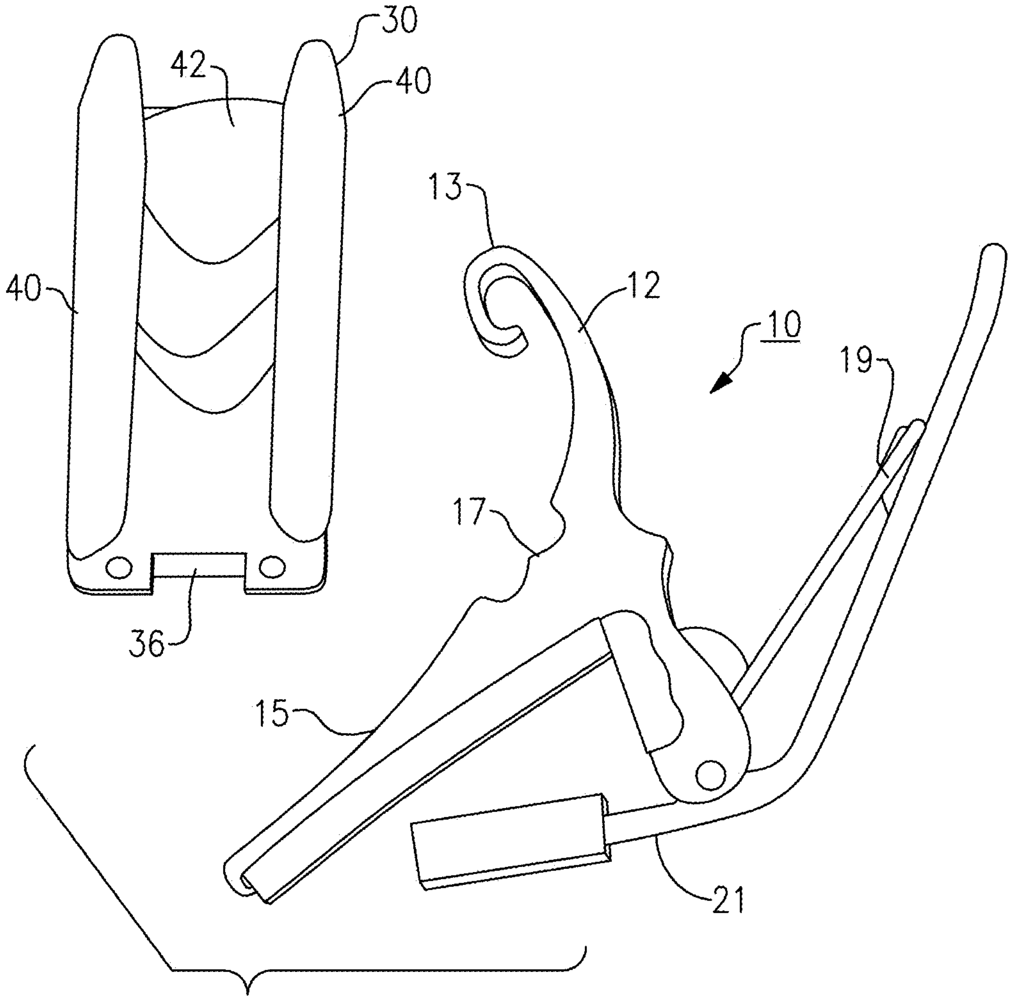
FIG. 3 shows the capo and an associated pick holder and dispenser.

As shown in FIG. 3, there may be a pick holder and dispenser 30 associated with this capo 10. The pick holder and dispenser 30 may be configured as shown and described in my copending application Ser. No. 18/070,681, filed Nov. 29, 2022, and published as Pub. No. US 2024/00768. This type of pick holder can contain a number of picks 42 held between two side walls 40 so the guitar player can easily access a pick when needed.

Figure 4:
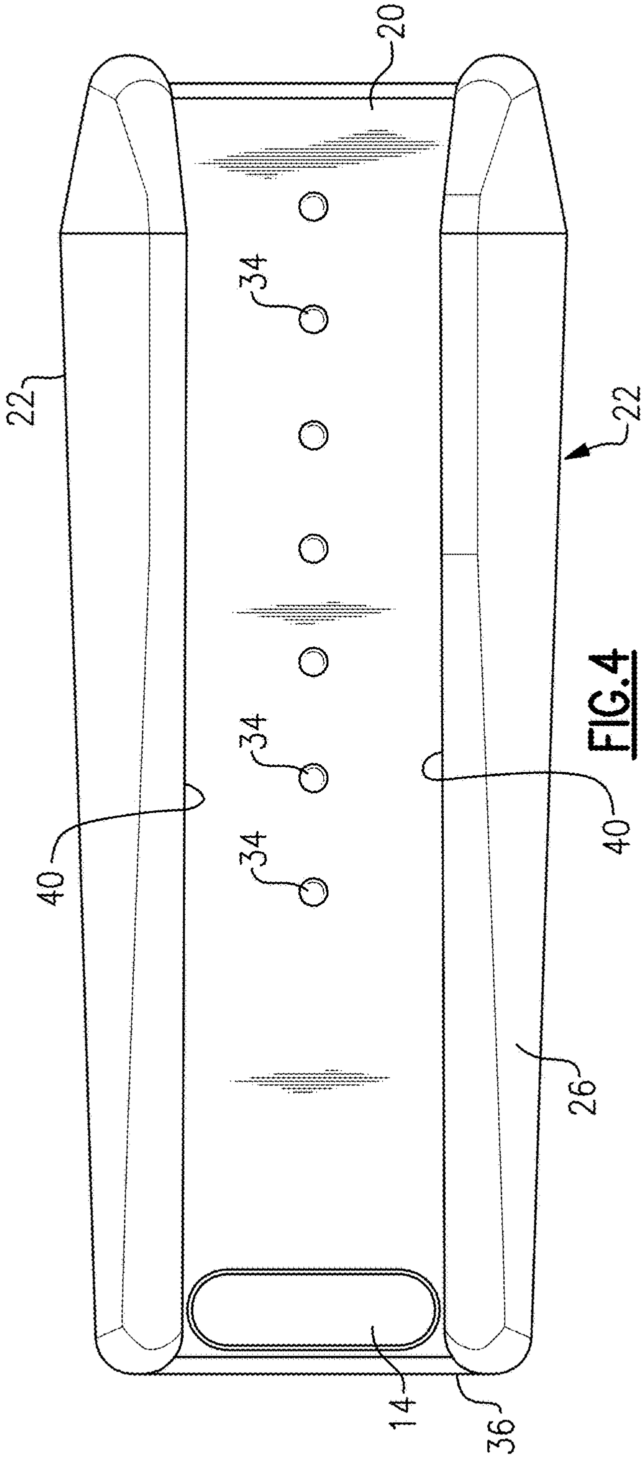
FIG. 4 is a front view of the pick holder and dispenser.
Figure 5:
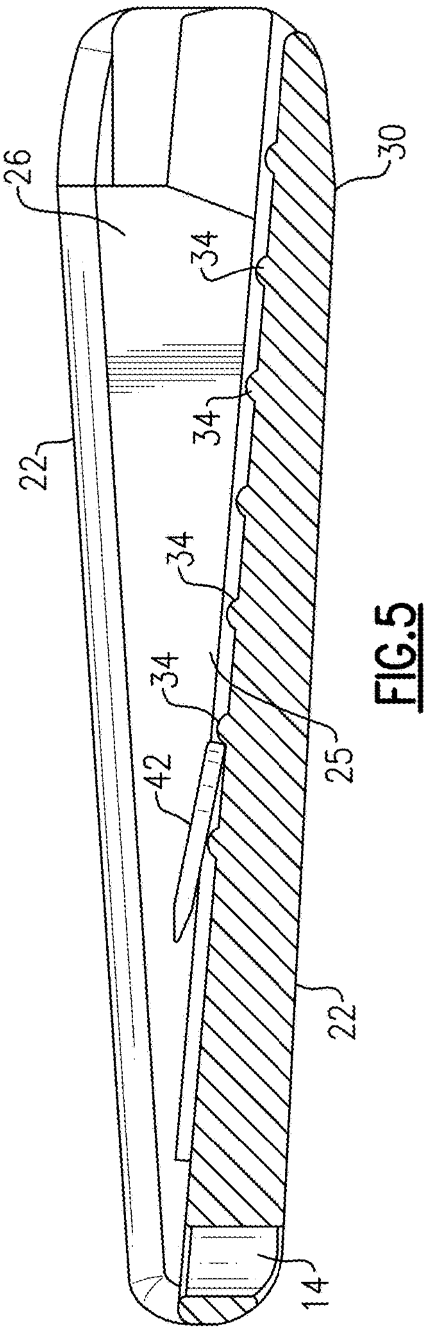
FIG. 5 is a side view of the pick holder and dispenser, shown partially in section, and featuring a recess or receptacle for fitting onto the head portion of the upper handle of the capo.

As illustrated in FIGS. 4 and 5, in addition to FIG. 3, the pick holder and dispenser 30 has an oblong back wall 32 on which there is or may be a row of buttons 34, with a button for each of a number of picks 42 stored within the holder and dispenser. In this embodiment, the picks 42 slide in and out from the upper end. Favorably, a notch 36 is disposed at a lower end, which in some embodiments may be the end from which the picks 42 may dispensed. Edges of the picks are able to slide within narrow recesses formed at the side walls 40.

Figure 6:
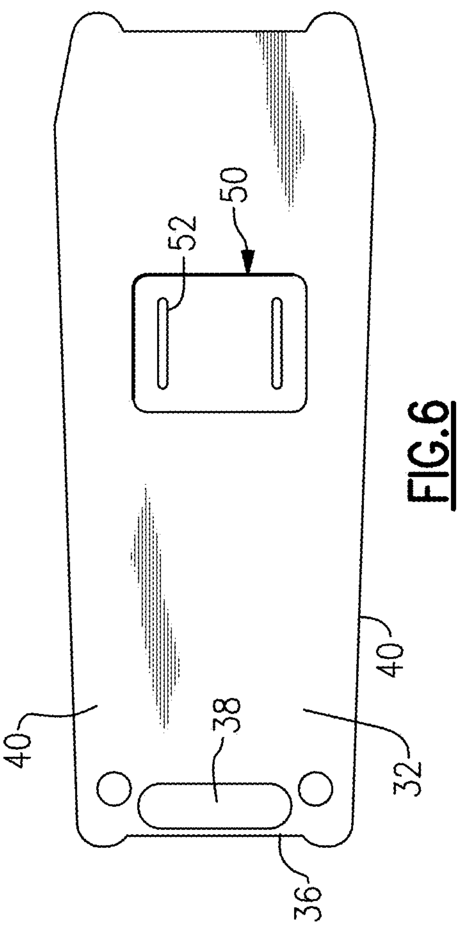
FIG. 6 illustrates the back side of the pick holder and dispenser featuring the recess or receptacle for fitting onto a guitar capo.
Figure 7:
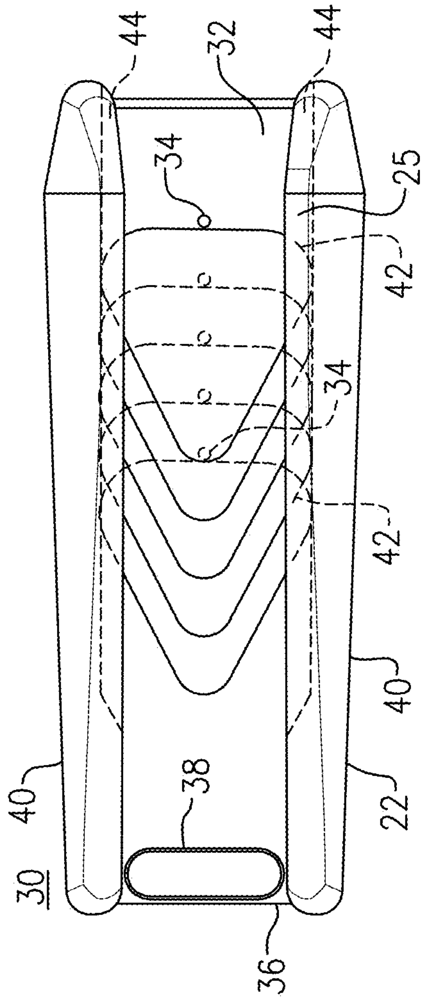
FIG. 7 shows the pick holder and dispenser showing a plurality of picks contained therein with a lower notch to be mounted on a heel of the capo.

In order to attach to the capo, there is a generally rectangular recess 50 formed in the back wall, and this is adapted to fit and retain the head or hand grip 13 of the upper handle 12, and an opening 38 at the other end allows for inserting picks or plectra 42. As seen in the back view of FIG. 6, the recess 50 also holds a pair of fins or ribs 52 that flex and help retain the head or hand grip 13 of the upper handle 12 of the capo. For those capos that do not have a head or hand grip at the end of the upper handle 12, a fitting of suitable dimensions can be attached to the handle to obtain a proper fitting in the recess 50.

Figure 8:
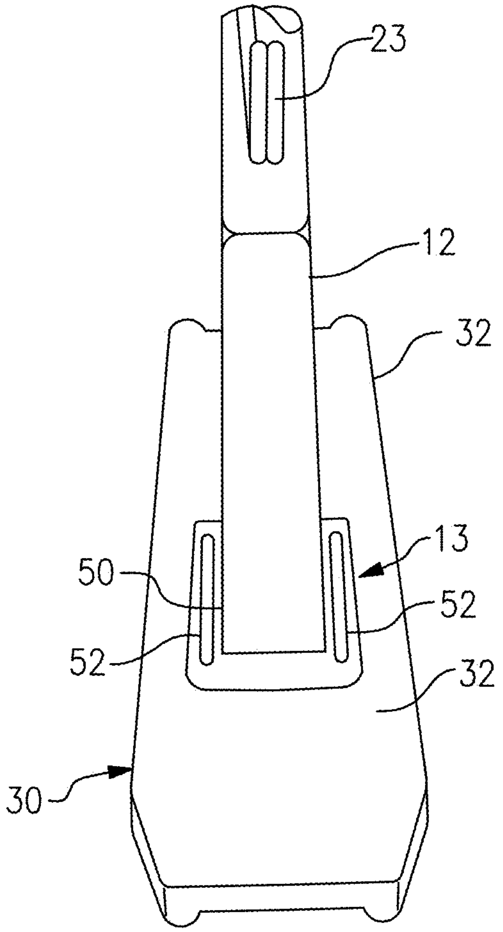
FIG. 8 illustrates the combination of the handle portion of the capo and pick holder removably attached to it.

FIG. 8 is a view of the reverse side of the pick holder and dispenser 40, showing the upper handle 12 *s* of the capo secured to the generally rectangular recess 50 of the pick holder and dispenser. At same time, the slot 36 at the lower end of the pick holder and dispenser is seated in one or another of the cylindrical recesses at the foot portion 17 of the capo upper body member.

Figure 9:
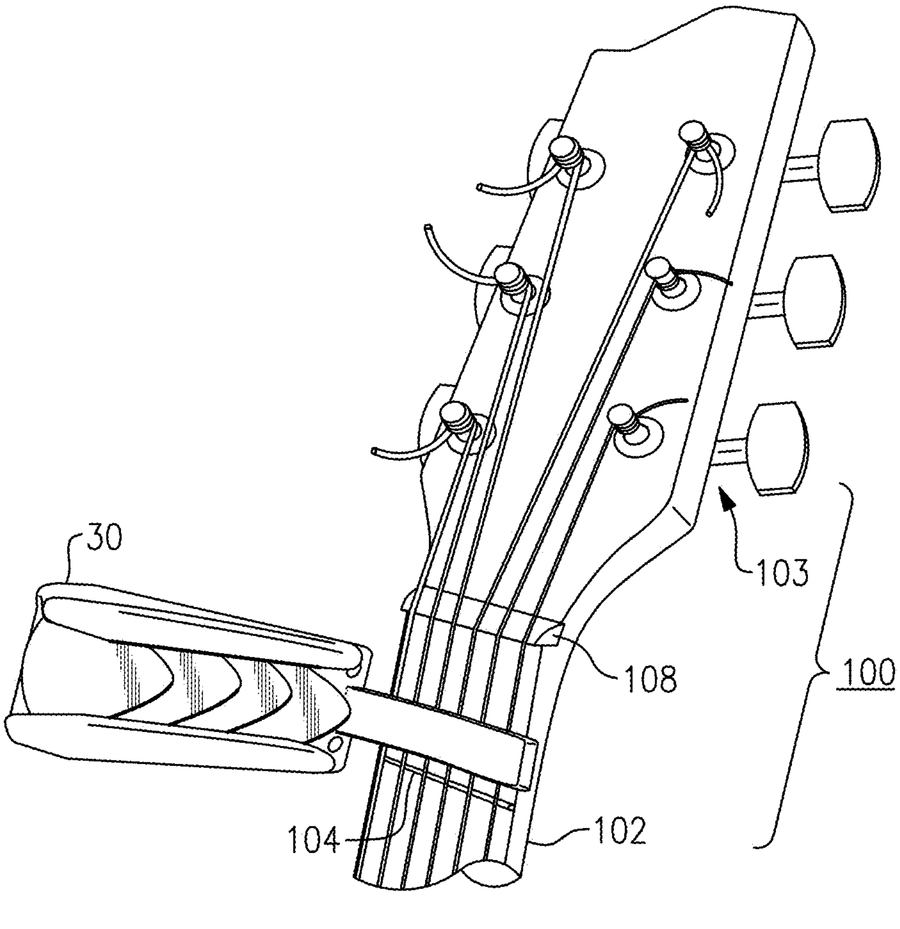
FIG. 9 shows the combination of capo and pick holder and dispenser here mounted on a guitar neck at the first fret thereof.

FIG. 9 illustrates the possible use of the capo 10 and pick holder and dispenser 30 on a guitar 100, here with the capo mounted at the position on neck 102 between the nut 108 and the first fret 104 of the guitar fingerboard or fretboard. When the capo is not needed to change the audio pitch of the guitar strings, the capo can be conveniently mounted on the head 103, favorably, beyond the tuning pegs for the D and G strings.

Many variations are possible, with respect to the design of the capo and with respect to the design for the pick holder, without departing from the scope and spirit of the invention, as defined in the appended Claims.

While this invention is illustrated and disclosed in terms of one or more preferred embodiments, and a simple example of a capo, the invention is not limited to such embodiments (including a wide variety of capos), and many variations thereof would present themselves to persons skilled in the art without departure from the invention as defined in the appended claims.

What is claimed is:

1. In combination, a guitar capo mountable on a neck of a guitar and a guitar pick holder and dispenser removably mountable on said capo;

wherein said capo comprises an upper member and a lower member connected at a pivot to one another;

the upper member having an upper handle, a string press bar projecting therefrom, and including a contact pad adapted to contact a fret board on the neck of the guitar, and the lower member being formed of a lower handle extending from said pivot so as to move rotatably toward and away from said upper handle, and a neck press bar extending from said pivot and aligned with said string press bar;

a spring configured to bias said lower handle away from said upper handle and to bias said neck press bar towards said string press bar, and said upper member having a foot region between said upper handle and said string press bar;

wherein said guitar pick holder and dispenser is formed of an elongated body with a base wall and parallel side walls, with a notch formed at a lower end, and a rectangular recess formed on a back wall of the elongated body, said rectangular recess including a pair of parallel fins configured to accept and hold a head portion of said upper handle, and wherein the notch of said pick holder and dispenser lodges onto said foot region.

2. The combination of claim 1, wherein said head portion of said upper handle is a loop portion formed at the end of the upper handle.

3. The combination of claim 1, wherein two concave recesses are disposed at said foot portion.

4. The combination of claim 1, wherein said pick holder is configured to hold at least three of said picks.

5. The combination of claim 1, wherein said side walls of the pick holder each are spaced from said base wall to define a pair of slits to receive edges of said guitar picks.

6. The combination of claim 5, wherein said slots are open at the upper end of the pick holder to permit the picks to be slid into and out of the pick holder.

7. The combination of claim 1 wherein one or more transverse recesses extending across the upper member at said foot region, and the notch of said pick holder and dispenser lodges onto said one or more transverse recesses.

* * * * *